US011620804B2

(12) United States Patent
Jacquot et al.

(10) Patent No.: US 11,620,804 B2
(45) Date of Patent: Apr. 4, 2023

(54) DATA BAND SELECTION USING MACHINE LEARNING

(71) Applicant: X Development LLC, Mountain View, CA (US)

(72) Inventors: Jie Jacquot, San Carlos, CA (US); Hongxu Ma, Mountain View, CA (US); Allen Richard Zhao, Mountain View, CA (US); Vadim Tschernezki, Schönefeld (DE); Ronald Votel, San Jose, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/834,269

(22) Filed: Jun. 7, 2022

(65) Prior Publication Data
US 2022/0383606 A1 Dec. 1, 2022

Related U.S. Application Data

(63) Continuation of application No. 16/887,037, filed on May 29, 2020, now Pat. No. 11,393,182.

(51) Int. Cl.
*G06V 10/143* (2022.01)
*G06K 9/62* (2022.01)
(Continued)

(52) U.S. Cl.
CPC ......... *G06V 10/143* (2022.01); *G06K 9/6256* (2013.01); *G06K 9/6262* (2013.01);
(Continued)

(58) Field of Classification Search
CPC ...... G06V 10/143; G06V 10/40; G06V 10/82; G06V 10/58; G06K 9/6256; G06K 9/6262;
(Continued)

(56) References Cited

U.S. PATENT DOCUMENTS 5,040,229 A 8/1991 Lee et al.
5,835,633 A 11/1998 Fujisaki et al.
(Continued)

FOREIGN PATENT DOCUMENTS

AU 2014292179 12/2015
CN 102289673 12/2011
(Continued)

OTHER PUBLICATIONS

Counting Objects with Faster R-CNN, Available online at https://softwaremill.com/counting-objects-with-faster-rcnn/, Jun. 2, 2017, 21 pages.
(Continued)

*Primary Examiner* — Michael S Osinski
(74) *Attorney, Agent, or Firm* — Kilpatrick Townsend & Stockton LLP

(57) ABSTRACT

Methods, systems, apparatus, and computer-readable media for data band selection using machine learning. In some implementations, image data comprising information for each of multiple wavelength bands is obtained. A multi-layer neural network is trained using the image data to perform one or more classification or regression tasks. A proper subset of the wavelength bands is selected based on parameters of a layer of the trained multi-layer neural network, where the parameters were determined through training of the multi-layer neural network using the image data. Output is provided indicating that the selected wavelength bands are selected for the one or more classification or regression tasks.

20 Claims, 5 Drawing Sheets

(51) Int. Cl.

| | |
|---|---|
| *G06N 3/04* | (2006.01) |
| *G06N 3/08* | (2006.01) |
| *G06T 3/40* | (2006.01) |
| *G06V 10/40* | (2022.01) |
| *G10L 15/16* | (2006.01) |
| *G06V 10/58* | (2022.01) |

(52) U.S. Cl.
CPC ......... *G06K 9/6267* (2013.01); *G06N 3/0454* (2013.01); *G06N 3/08* (2013.01); *G06T 3/40* (2013.01); *G06V 10/40* (2022.01); *G06V 10/58* (2022.01); *G10L 15/16* (2013.01)

(58) Field of Classification Search
CPC .. G06K 9/6267; G06K 9/6257; G06K 9/6259; G06N 3/0454; G06N 3/08; G06N 3/04; G06N 20/20; G06N 20/10; G06N 7/005; G06T 3/40; G06T 1/20; G06T 2207/20081; G06T 2207/20084; G06T 2207/10016; G06T 2207/10036; G10L 15/16

See application file for complete search history.

(56) References Cited

U.S. PATENT DOCUMENTS

| | | | |
|---|---|---|---|
| 7,840,071 | B2 | 11/2010 | Tang et al. |
| 8,164,673 | B2 | 4/2012 | Horie |
| 8,280,140 | B2 | 10/2012 | Levenson et al. |
| 8,284,991 | B2 | 10/2012 | Tojo et al. |
| 8,406,469 | B2 | 3/2013 | Fisher |
| 8,860,942 | B1 | 10/2014 | Ewing et al. |
| 9,107,624 | B2 | 8/2015 | Darty |
| 9,251,431 | B2 | 2/2016 | Doepke et al. |
| 9,268,110 | B2 | 2/2016 | Bueler et al. |
| 9,945,721 | B2 | 4/2018 | Abolbashari et al. |
| 10,452,924 | B2 | 10/2019 | Adato et al. |
| 10,453,197 | B1 | 10/2019 | Cholakkal et al. |
| 10,803,313 | B2 | 10/2020 | Ritter et al. |
| 10,810,723 | B2 | 10/2020 | Onoro-Rubio et al. |
| 11,068,747 | B2 | 7/2021 | Goldstein et al. |
| 11,393,182 | B2 | 7/2022 | Jacquot et al. |
| 2008/0118106 | A1 | 5/2008 | Kilambi et al. |
| 2015/0161995 | A1 | 6/2015 | Sainath et al. |
| 2016/0358027 | A1 | 12/2016 | Hotta et al. |
| 2017/0132512 | A1 | 5/2017 | Ioffe |
| 2017/0147905 | A1 | 5/2017 | Huang et al. |
| 2017/0316285 | A1 | 11/2017 | Ahmed et al. |
| 2018/0284273 | A1 | 10/2018 | Buettgen et al. |
| 2018/0293488 | A1 | 10/2018 | Dang et al. |
| 2019/0065880 | A1 | 2/2019 | Loginov et al. |
| 2019/0139193 | A1 | 5/2019 | Navarrete Michelini et al. |
| 2019/0354857 | A1 | 11/2019 | Sallee et al. |
| 2020/0121376 | A1 | 4/2020 | Zhang et al. |
| 2020/0272823 | A1 | 8/2020 | Liu et al. |
| 2020/0302149 | A1 | 9/2020 | Gottemukkula |
| 2020/0333185 | A1 | 10/2020 | Vrabie et al. |
| 2020/0356820 | A1 | 11/2020 | Rephaeli et al. |
| 2021/0025962 | A1 | 1/2021 | Smyth et al. |
| 2021/0043331 | A1 | 2/2021 | Ozcan et al. |
| 2021/0089895 | A1 | 3/2021 | Munoz Delgado |
| 2021/0097344 | A1 | 4/2021 | Goldstein et al. |
| 2021/0105451 | A1 | 4/2021 | Oyman et al. |
| 2021/0133938 | A1 | 5/2021 | Lee et al. |
| 2021/0201140 | A1 | 7/2021 | Watanabe et al. |
| 2021/0224611 | A1 | 7/2021 | Yu |
| 2021/0248716 | A1 | 8/2021 | Vera-Gonzalez et al. |
| 2021/0275028 | A1 | 9/2021 | Kumar et al. |

FOREIGN PATENT DOCUMENTS

| | | |
|---|---|---|
| CN | 103942562 | 7/2014 |
| CN | 104077613 | 10/2014 |
| CN | 104732240 | 6/2015 |
| CN | 105528589 | 4/2016 |
| CN | 108921822 | 11/2018 |
| CN | 110084311 | 8/2019 |
| CN | 108052984 | 11/2019 |
| CN | 110647793 | 1/2020 |
| EP | 2208974 | 7/2010 |
| EP | 3567518 | 11/2019 |
| WO | 2007098123 | 8/2007 |
| WO | 2016095117 | 6/2016 |
| WO | 2017223206 | 12/2017 |
| WO | 2018141429 | 8/2018 |
| WO | 2018187632 | 10/2018 |
| WO | 2019084854 | 5/2019 |

OTHER PUBLICATIONS

MobileNet V2, Pytorch Team, Available Online at: https://pytorch.org/hub/pytorch_vision_mobilenet_v2/, Accessed from Internet on Sep. 23, 2021, 2 pages.

MobileNetV2: The Next Generation of On-Device Computer Vision Networks, Google AI Blog, Available Online at: http://ai.googleblog.com/2018/04/mobilenetv2-next-generation-of-on.html, Apr. 3, 2018, 3 pages.

Objects Counting by Estimating a Density Map with Convolution Neural Networks, Available online at https://towardsdatascience.com/objects-counting-by-estimating-a-density-map-wiith-convolutional-neural-networks-c01086f3b3ec, Sep. 27, 2019, pp. 1-15.

R-CNN, Fast R-CNN, Faster R-CNN, YOLO Object Detection Algorithms, Available online at https://towardsdatascience.com/r-cnn-fast-r-cnn-faster-r-cnn-yolo-object-detection-algorithms-36d53571365e, Jul. 10, 2018, 11 pages.

Resnet101, MathWorks, Available Online at: https://www.mathworks.com/help/deeplearning/ref/resnet101.html;jsessionid=1a374f68ed8d150528c1ba657502, Oct. 24, 2018, 3 pages.

Tensorflow Count Objects in Image, Available online at: https://stackoverflow.com/questions/42375680/tensorflowcount-objects-in-image, Feb. 21, 2017, 2 pages.

U.S. Appl. No. 16/887,037, Notice of Allowance dated Mar. 23, 2022, 12 pages.

Akai et al., Distortion-Adaptive Grape Bunch Counting for Omni-directional Images, Available Online at: https://arxiv.org/pdf/2008.12511.pdf, Aug. 28, 2020, 8 pages.

Annibale et al., Optical Measurement of Focal Offset in Tunable Lenses, Optics Express, vol. 24, No. 2, Jan. 25, 2016, pp. 1031-1036.

Barbin et al., Near-Infrared Hyperspectral Imaging for Grading and Classification of Pork, Meat Science, vol. 90, No. 1, Jan. 2012, pp. 259-268.

Bargoti et al., Deep Fruit Detection in Orchards, IEEE International Conference on Robotics and Automation (ICRA), May 29-Jun. 3, 2017, pp. 3626-3633.

Baweja et al., StalkNet: A Deep Learning Pipeline for High-Throughput Measurement of Plant Stalk Count and Stalk Width, Field and Service Robotics, Nov. 2017, pp. 271-284.

Brownlee, How to Configure Image Data Augmentation in Keras, Machine Learning Mastering, Available Online at: https://machinelearningmastery.com/how-to-configure-image-data-augmentation-when-training-deep-learning-neural-networks/, Apr. 12, 2019, 58 pages.

Chen et al., Predicting the Anthocyanin Content of Wine Grapes by NIR Hyperspectral Imaging, Food Chemistry, vol. 172, Apr. 1, 2015, pp. 788-793.

Cohen et al., Count-ception: Counting by Fully Convolutional Redundant Counting, Proceedings of the IEEE International Conference on Computer Vision, 2017, pp. 18-26.

Culurciello, Segmenting, Localizing and Counting Object Instances in an Image, Available Online at https://towardsdatascience.com/segmenting-localizing-and-counting-object-instances-in-an-image-878805fef7fc, Oct. 26, 2017, pp. 1-8.

Cu-Nguyen et al., An Imaging Spectrometer Employing Tunable Hyperchromatic Microlenses, Light: Science & Applications, vol. 5, No. 4, Apr. 8, 2016, 9 pages.

(56) References Cited

OTHER PUBLICATIONS

Cu-Nguyen et al., Tunable Hyperchromatic Lens System for Confocal Hyperspectral Sensing, Optics Express, vol. 21, No. 23, Nov. 18, 2013, pp. 27611-27621.
Dahab et al., Automated Brain Tumor Detection and Identification Using Image Processing and Probabilistic Neural Network Techniques, International Journal of Image Processing and Visual Communication, vol. 1, No. 2, Oct. 2012, 5 pages.
Elmasry et al., Chemical-Free Assessment and Mapping of Major Constituents in Beef Using Hyperspectral Imaging, Journal of food Engineering, vol. 117, No. 2, Jul. 2013, pp. 235-246.
Gao et al., Counting Dense Objects in Remote Sensing Images, CoRR, Available Online at: https://arxiv.org/pdf/2002.05928.pdf, Feb. 14, 2020, 5 pages.
Gao et al., Intra-Ensemble in Neural Networks, CoRR, Available Online at: https://arxiv.org/pdf/1904.04466v1.pdf, Apr. 9, 2019, 11 pages.
Gao et al., PSCNet: Pyramidal Scale and Global Context Guided Network for Crowd Counting, CoRR, Available Online at: https://arxiv.org/pdf/2012.03597v1.pdf, Dec. 7, 2020, 11 pages.
Gat, Imaging Spectroscopy Using Tunable Filters: A Review, Proceedings of SPIE—The International Society for Optical Engineering, vol. 4056, No. 1, Apr. 2000, pp. 50-64.
Godi et al., SIMCO: SIMilarity-Based Object Counting, CoRR, Available Online at: https://arxiv.org/pdf/1904.07092.pdf, Oct. 13, 2020, 6 pages.
Goel et al., Low-Power Object Counting with Hierarchical Neural Networks, CoRR, Available Online at: https://arxiv.org/pdf/2007.01369.pdf, Jul. 2, 2020, 6 pages.
Guan et al., Understanding the Ability of Deep Neural Networks to Count Connected Components in Images, CoRR, Available Online at: https://arxiv.org/pdf/2101.01386.pdf, Jan. 5, 2021, 7 pages.
Gupta et al., Hyperspectral Imaging Using Acoustic-Optic Tunable Filters, Part of the SPIE Conference on Automatic Target Recognition IX, vol. 3718, Apr. 1999, pp. 512-521.
Habermann et al., Supervised Band Selection in Hyperspectral Images Using Single-Layer Neural Networks, International Journal of Remote Sensing, vol. 40, No. 10, Dec. 2018, pp. 1-27.
Habermann et al., Unsupervised Hyperspectral Band Selection using Clustering and Single-Layer Neural Network, Revue Francaise de Photogrammetrie et de Teledetection, Societe Frarwaise de Photogrammetrie et de Teledetection, Jun.-Sep. 2018, pp. 33-42.
Halstead et al., Fruit Quantity and Quality Estimation using a Robotic Vision System, CoRR, Available Online at: https://arxiv.org/pdf/1801.05560.pdf, Jan. 17, 2018, 8 pages.
Hani et al., Apple Counting using Convolutional Neural Networks, IEEE/RSJ International Conference on Intelligent Robots and Systems (IROS), Oct. 2018, 7 pages.
Iwai et al., Speeded-Up Focus Control of Electrically Tmrnble Lens by Sparse Optimization, Scientific Reports, vol. 9, No. 12365, Aug. 26, 2019, pp. 1-6.
Kahveci, How to Count Objects on the Image with Deep Learning Algorithms?, Available Online at: https://www.researchgate.net/post/How-to-count-objects-on-the-image-with-deep-learning-algorithms, Apr. 30, 2020, 8 pages.
Kamruzzaman et al., Non-Destructive Prediction and Visualization of Chemical Composition in Lamb Meat Using NIR Hyperspectral Imaging and Multivariate Regression, Innovative Food Science & Emerging Technologies, vol. 16, Oct. 2012, pp. 218-226.
Kasmani et al., A-CCNN: Adaptive CCNN for Density Estimation and Crowd Counting, CoRR, Available Online at: https://arxiv.org/pdf/1804.06958.pdf, Apr. 20, 2018, 5 pages.
Koirala et al., Deep Learning for Real-Time Fruit Detection and Orchard Fruit Load Estimation: Benchmarking of 'Mango YOLO', Precision Agriculture, vol. 20, Feb. 28, 2019, pp. 1107-1135.
Lempitsky et al., Learning to Count Objects in Images, Advances in Neural Information Processing Systems, vol. 23, Dec. 2010, pp. 1-9.
Liu et al., Robust Fruit Counting: Combining Deep Learning, Tracking, and Structure from Motion, IEEE/RSJ International Conference on Intelligent Robots and Systems, Aug. 2018, 8 pages.
Marsden et al., People, Penguins and Petri Dishes: Adapting Object Counting Models to New Visual Domains and Object Types without Forgetting, CoRR, Nov. 2017, pp. 8070-8079.
McGregor et al., Adaptive Hyperspectral Imager: Design, Modeling, and Control, Journal of Optics, vol. 17, No. 8, Aug. 2015, 11 pages.
Mikami et al., DeepCounter: Using Deep Leaning to Count Garbage Bags, IEEE 24th International Conference on Embedded and Real-Time Computing Systems and Applications (RTCSA), Jan. 9, 2019, 10 pages.
Millan et al., Dynamic Compensation of Chromatic Aberration in a Programmable Diffractive Lens, Optics Express, vol. 14, No. 20, Oct. 2, 2006, pp. 9103-9112.
Nesteruk et al., Image Augmentation for Multitask Few-Shot Leaning: Agricultural Domain Use-Case, Available Online at: https://arxiv.org/pdf/2102.12295.pdf, Feb. 2021, 12 pages.
Noroozi et al., Representation Learning by Learning to Count, Proceedings of the IEEE International Conference on Computer Vision, 2017, pp. 5898-5906.
Rahnemoonfar et al., Deep Count: Fruit Counting Based on Deep Simulated Learning, Sensors, vol. 17, No. 4, Apr. 2017, 12 pages.
Sam et al., Switching Convolutional Neural Network for Crowd Counting, 2017 IEEE Conference on Computer Vision and Pattern Recognition, Jul. 2017, 9 pages.
Santos De Arruda et al., Counting and Locating High-Density Objects Using Convolutional Neural Network, CoRR, Available Online at https://arxiv.org/pdf/2102.04366.pdf, Feb. 8, 2021, 15 pages.
Segui et al., Learning to Count with Deep Object Features, Proceedings of the IEEE Conference on Computer Vision and Pattern Recognition, May 2015, pp. 90-96.
Shang et al., End-to-End Crowd Counting via Joint Learning Local and Global Count, 2016 IEEE International Conference on Image Processing, Sep. 2016, pp. 1215-1219.
Sharma, It's a Record-Breaking Crowd! A Must-Read Tutorial to Build your First Crowd Counting Model using Deep Learning, Analytics Vidhya, Available Online at: https://www.analyticsvidhya.com/blog/2019/02/building-crowd-counting-modelpython/, Feb. 18, 2019, 11 pages.
Shen et al., Liquid Crystal Integrated Metalens with Tunable Chromatic Aberration, Advanced Photonics, vol. 2, No. 3, May-Jun. 2020, pp. 1-7.
Sokhandan et al., A Few-Shot Sequential Approach for Object Counting, CoRR, Available Online at: https://arxiv.org/pdf/2007.01899v2.pdf, Jul. 2020, 19 pages.
Stein et al., Image Based Mango Fruit Detection, Localization and Yield Estimation Using Multiple View Geometry, Sensors, vol. 16, No. 11, Nov. 2016, pp. 1-25.
Suzuki et al., Estimation of Chemical Composition of Grass in Meadows using Hyperspectral Imaging, Environmental Control in Biology, vol. 46, No. 2, Jan. 2008, pp. 129-137.
Taherkhani et al., Deep Sparse Band Selection for Hyperspectral Face Recognition, arXiv:1908.09630, Available Online at: chrome-extension://efaidnbmnnnibpcajpcglclefindmkaj/https://arxiv.org/pdf/1908.09630.pdf, Aug. 15, 2019, 31 pages.
Takahashi et al., A Novel Weight-Shared Multi-Stage CNN for Scale Robustness, IEEE Transactions on Circuits and Systems for Video Technology, vol. 14, No. 8, Available Online at: https://arxiv.org/pdf/1702.03505.pdf, Aug. 2015, pp. 1-13.
Tan et al., Cells Counting with Convolutional Neural Network, Intelligent Computing Methodologies, Jul. 2018, pp. 102-111.
Walach et al., Learning to Count with CNN Boosting, Computer Vision, Sep. 2016, 17 pages.
Wang et al., Correcting Axial Chromatic Aberration in a Fixed Focal Plane, Near-Infrared Imaging System, CSBE/SCGAB Annual Conference, Jul. 16-19, 2006, 14 pages.
Xu et al., Dilated-Scale-Aware Attention ConvNet for Multi-Class Object Counting, CoRR, Available online at https://arxiv.org/pdf/2012.08149.pdf, Dec. 2020, 7 pages.
Yang et al., Reverse Perspective Network for Perspective-Aware Object Counting, Proceedings of the IEEE/CVF Conference on Computer Vision and Pattern Recognition, Jun. 2020, pp. 4374-4383.

(56) References Cited

OTHER PUBLICATIONS

Zhan et al., A New Hyperspectral Band Selection Approach based on Convolutional Neural Network, IEEE International Geoscience mid Remote Sensing Symposium, Jul. 23-28, 2017, pp. 3660-3663.

Zhang et al., Cross-Scene Crowd Counting via Deep Convolutional Neural Networks, Proceedings of the IEEE Conference on Computer Vision and Pattern Recognition, Jun. 2015, pp. 833-841.

Zhao et al., Chromatic Aberrations Correction for Imaging Spectrometer Based on Acousto-Optic Tunable Filter with Two Transducers, Optics Express, vol. 25, No. 20, Oct. 2, 2017, pp. 23809-23825.

DATA BAND SELECTION USING MACHINE LEARNING

CROSS-REFERENCE TO RELATED APPLICATION

This application is a continuation of U.S. application Ser. No. 16/887,037, filed May 29, 2020, the contents of which are incorporated by reference herein.

BACKGROUND

Machine learning models enable the classification of new observed data based on relationships learned from various training examples. The data can be of any type, such as image, audio, text, etc. As an example, classification can be used to recognize content of new observed data. Machine learning can be used to perform various tasks, such as image recognition, audio recognition, object classification, etc.

SUMMARY

In some implementations, a computer system is configured to automatically select the types of data or ranges of data that are most appropriate for a machine learning task. For example, the system can evaluate various data bands that are available for use in carrying out a task (e.g., a classification or regression task), and then select a subset of the data bands that the system predicts to be most effective for performing the task. The system can perform the evaluation and selection of data bands in an unsupervised manner. The system can then train a machine learning model to use the selected subset of data bands to perform the task. These techniques enable the system to identify, from a large set of potential input features, the input features that will allow models to achieve the highest accuracy. In addition, limiting the input features to the selected subset of the available input features often allows for smaller models, lower computational demands, and lower power usage. These benefits can be achieved even while maintaining or increasing accuracy of the models compared to reference models that use the entire set of available input features, especially by eliminating input features that add noise to the analysis rather than adding predictive value.

The system can use the training of a machine learning model in the process of evaluating available data bands. The model can be configured to process different data bands with different model parameters that are adjusted through training. The values of the model parameters can then be used as scores or indicators for the importance of the respective bands. For example, the evaluation of data bands can include training a neural network that includes a scaling layer that applies a different scaling factor to input data for each data band. For example, input values for a first data band can be scaled using a first scaling parameter, input values for a second data band can be scaled using a second scaling parameter, and so on. As the neural network is trained to perform a task, the scaling parameters are adjusted along with other parameters of the neural network. After training, the values for the scaling parameters for the data bands can be used as importance scores to indicate the relative importance of the different data bands in carrying out the task. For example, the data bands with the highest corresponding scaling parameter values can be selected as the best data bands to be used in creating, training, and using machine learning models for the task.

In general, this document describes various computer-implemented techniques that can be used to reduce the amount or types of input data used to perform classification and/or regression tasks. The system can evaluate the available input data and select the portions of the data that have the most significant impact on the accuracy of the task. This allows the system to eliminate portions of the data that play a less significant role in successfully carrying out the task. The set of available input data can be divided into data bands, e.g., ranges or groups within a data set. The techniques presented herein determine a subset of data bands, selected from among a larger set of available data bands, that can provide enough information for classification and/or regression tasks on the input data without causing a significant reduction in accuracy of those tasks.

To select the data bands best suited for a task, the system can train a machine learning (ML) model based on a set of data bands (or simply "bands") of training data, score each band based on parameters of the trained ML model, and select a subset of the bands based on the scores. The system can also train a second machine learning model based on the selected subset of the bands. Because the second ML model processes input for fewer bands than the first ML model, the second ML model processes less data and can include fewer parameters than the first ML model. Accordingly, the second ML model configured to use the subset of bands can be less complex and require less computation and power for classification/regression tasks compared to ML models configured to use the full set of bands. Nevertheless, the subset of bands can be selected based on the scores to include the inputs that contribute the most to the accuracy of predictions, thus allowing high accuracy even when using input for less than the full set of available bands.

The system can validate the selection of bands to ensure that appropriate levels of accuracy are achieved. For example, the system can generate multiple ML models using different combinations of available bands, and the reviewing results of the models to verify that the selected subset performs with the highest accuracy. If the output of the second ML model is not accurate enough (e.g., is less accurate than another tested combination of bands), the system can revise its band selection, for example, by adding one or more bands to the selected subset or in some cases removing one or more bands from the subset.

In some implementations, the validation process includes evaluating different sub-combinations of the selected subset of bands. Rather than test every possible permutation of available bands, the system may instead test a model using the full set of available bands, a model using the selected subset of bands, and models to determine whether fewer bands than what is already selected provide a ML model with higher performance. For example, it may be the case that the technique has selected four bands as the set of bands, but the evaluation process determines that including only three particular bands out of those four bands would provide a ML model with the highest accuracy in data classification/regression. This technique can greatly increase the speed and efficiency of the validation process, especially when there are large numbers of bands.

The techniques in the present application can be used for many different types of data bands, for example, frequency bands, wavelength bands, time ranges, and so on. The type of data band can vary depending on the application. For example, image processing applications (e.g., object recognition, object detection, object state classification, etc.) may use information for different wavelength bands. As another example, audio processing applications (e.g., speech recognition, speech detection, keyword spotting, voice identification, etc.) may use information for different frequency bands. Various examples below discuss a use case with image data, in particular, hyperspectral images. However, similar techniques can be used on other types of data such as audio, video, text, location data, transmission network data, etc. For example, the data bands can be wavelength bands, frequency bands, information bands, data from different sources, data of different groups or categories, etc.

The techniques presented herein can be used to provide one or more of the following technical advantages and/or technical improvements. For example, the techniques can enable a computer system to identify the best data bands to use for a modeling or machine learning application in an automatic, unsupervised way. In addition, the techniques allow machine learning models to achieve high accuracy with less input data, resulting in smaller, faster, and more efficient models. For example, a hyperspectral image often includes many different bands of data (e.g., images for different wavelength bands), and so relatively large models and significant computational resources would be needed to process all of the data. Nevertheless, the present technique provides the ability to reduce the model size and amount of computational recourses required, without compromising modeling accuracy. As discussed further below, the band selection technique reduces the size of the input data to be processed by determining a subset of data bands have the most significant impact on a machine learning task. The selected subset of bands, rather than all data bands, can then be used to train models and to perform data classification and/or regression tasks. Since less than all number of bands are used, the models need to process less input data than, for example, the full set of wavelength bands in a hyperspectral image. A smaller size data can lead to faster data processing, a smaller storage size for a model, faster model training, greater power efficiency, lower hardware and computational demands, and other benefits.

In many cases, the present technique can reduce the input data size without sacrificing computational accuracy for the modeling or machine learning task to be performed. For example, a validation process can ensure that modeling using the selected subset of bands performs at least as well as modeling using the full set of bands or, if desired, with accuracy diminished no more than a maximum amount with respect to modeling using the full set of bands. The technique can automatically adjust the number of selected bands to achieve the highest performance for data classification or regression or to achieve a desired tradeoff between input data size (and thus model size, computation demand, etc.) and accuracy. Indeed, reducing the number of bands can improve performance in classification/regression in some cases. For example, some of the data bands may provide more noise than useful information for a data classification/regression task. The band selection techniques of this document can omit less significant bands and bands that detract from model accuracy to improve both accuracy and efficiency.

Methods in accordance with the present disclosure may include any combination of the aspects and features described herein. That is, methods in accordance with the present disclosure are not limited to the combinations of aspects and features specifically described herein, but also include any combination of the aspects and features provided.

In one general aspect, a method performed by one or more computers includes: obtaining, by the one or more computers, image data comprising information for each of multiple wavelength bands; training, by the one or more computers, a multi-layer neural network using the image data to perform one or more classification or regression tasks; selecting, by the one or more computers, a proper subset of the wavelength bands based on parameters of a layer of the trained multi-layer neural network, wherein the parameters were determined through training of the multi-layer neural network using the image data; and providing, by the one or more computers, output indicating that the selected wavelength bands are selected for the one or more classification or regression tasks.

In some implementations, the image data comprises image data for multispectral images or hyperspectral images, wherein the multispectral images or hyperspectral images each include data for four or more different wavelength bands.

In some implementations, the method includes: based on the selection of the proper subset of the wavelength bands, training, by the one or more computers, a second neural network to perform the one or more classification or regression tasks using image data for the wavelength bands in the selected proper subset; and providing the second neural network for use in performing the one or more classification or regression tasks.

In some implementations, the method includes training the second neural network to perform the one or more classification or regression tasks based on input that (i) includes information for each of the selected wavelength bands and (ii) excludes information for wavelength bands of the multiple wavelength bands that are not included in the selected proper subset.

In some implementations, the method includes training the second neural network to perform the one or more classification or regression tasks based on input information for fewer than all of the wavelength bands in the selected proper subset.

In some implementations, the method includes validating the selected subset of the wavelength bands, wherein providing the output is performed in response to validating the selected subset of the wavelength bands.

In some implementations, the method includes training multiple neural networks to perform the one or more classification or regression tasks, each of the multiple neural networks being trained to perform the one or more classification tasks based on a different set of the multiple wavelength bands; and evaluating the accuracy of the multiple neural networks. Providing the output indicating that the selected wavelength bands are selected is based on evaluating the accuracy of the multiple neural networks.

In some implementations, training the multiple neural networks includes: training a first model to process input information for each of the selected wavelength bands and not for other wavelength bands of the multiple wavelength bands; training a second model to process input information for each of the multiple wavelength bands; and training one or more third models that each are configured to process input information for different sub-combinations of the selected wavelength bands.

In some implementations, evaluating the accuracy of the multiple neural networks comprises: generating an accuracy measure for each of the multiple neural networks; determining, based on comparison of the accuracy measures, that the accuracy measure for the first model indicates greater accuracy than the first model and the one or more third models.

In some implementations, the multi-layer neural network is configured to receive an input vector comprising multiple sets of input values, each set of input values being derived from image data for a different wavelength band of the multiple wavelength bands. For each set of input values, the multi-layer neural network is configured to scale each input value in the set of input values using a same band-specific scaling parameter having a value learned through training of the multi-layer neural network.

In some implementations, the multi-layer neural network comprises (i) a scaling layer configured to apply the band-specific scaling parameters for the multiple wavelength bands to the respective sets of input values for the multiple wavelength bands, and (i) one or more additional layers configured to process output of the scaling layer.

In some implementations, the scaling layer is configured to receive, as input, the values of the input vector and to provide, as output, scaled values generated by applying the band-specific scaling parameters to the corresponding sets of input values.

In some implementations, each of the band-specific scaling parameters is a neural network weight or a neural network bias.

In some implementations, training the multi-layer neural network comprises jointly training the scaling layer and the one or more additional layers such that values for the band-specific scaling parameters and parameters of the one or more additional layers are adjusted during training.

In some implementations, the method includes extracting values for the band-specific scaling parameters from the trained neural network. Selecting the proper subset of the wavelength bands is based on an evaluation of the extracted values for the band-specific scaling parameters.

In some implementations, selecting the proper subset of the wavelength bands based on an evaluation of the extracted values for the band-specific scaling parameters comprises: selecting a predetermined number of the wavelength bands for which the extracted values have a highest magnitude.

In some implementations, selecting the proper subset of the wavelength bands based on an evaluation of the extracted values for the band-specific scaling parameters comprises: selecting each of the wavelength bands for which the extracted value satisfies a threshold.

In some implementations, the training, the selecting, and the providing are part of a fully automated process of selecting wavelength bands for the one or more classification or regression tasks.

Other embodiments of these aspects include corresponding systems, apparatus, and computer programs, e.g., encoded on computer storage devices, configured to perform the actions of the methods. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
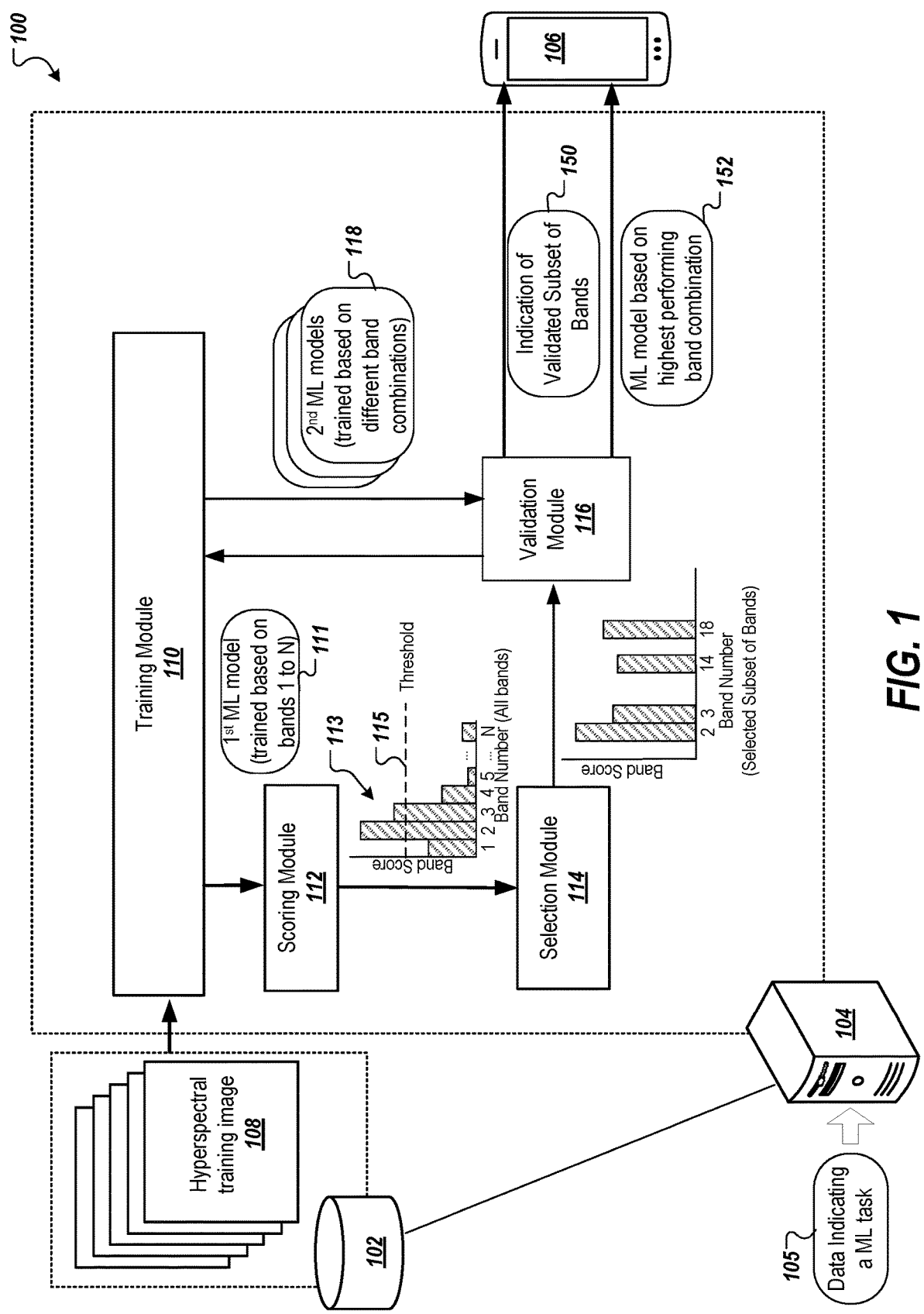
FIG. 1 depicts an example system for using machine learning to select data bands.

FIG. 1 depicts an example system 100 for using machine learning to select data bands. The system 100 includes a computer system 104, a data storage system 102, and a computing device 106. The computer system 104 is configured to automatically select data bands to be used for a ML task, for example, classification with respect to a certain set of classes or regression to predict a certain type of output. In the example of FIG. 1, the computer system 104 receives data 105 that describes a ML task, e.g., items to be classified, items to be predicted, etc. The computer system 104 using machine learning to select a subset of bands that is appropriate for the ML task. The computer system 104 validates the selection of bands to verify that the selected subset of bands provides appropriate accuracy for the ML task. The computer system 104 then provides output data 150 to indicate the selected bands for the ML task. In some implementations, the computer system 104 generates a model 152 to perform the ML task, and provides the model 152 or results generated using the model 152.

The example of FIG. 1 shows an example in which the computer system 104 evaluates wavelength bands of image data to select the best subset of wavelength bands for a classification task. The image data can include data for multiple different wavelength bands, for example, multi-spectral image data (e.g., typically 3 to 10 different band measurements) or hyperspectral image data (e.g., typically 11 or more different band measurements). The image data for an image may include a band measurements (e.g., an intensity value) for each wavelength band, for each pixel of the image. For example, an image with image data for 20 wavelength bands can include 20 intensity values for each pixel, one intensity value for each of the wavelength bands. The images can include image data for wavelength bands in the visible range and/or wavelength bands outside the visible range. For example, the wavelength bands may include bands within or including a portion of one or more of near-infrared (NIR), mid-wavelength infrared (MWIR), long-wavelength infrared (LWIR), far infrared (FIR), near ultraviolet (NUV), middle ultraviolet (MUV), far ultraviolet (FUV), etc. Similarly, the wavelength ranges of the bands can be narrower than and centered differently than the typical red, green, and blue bands used for standard visible-light image capture.

In hyperspectral imaging, the reflectance of an object in different wavelength bands can indicate the properties of the object. Different objects and materials respond differently to different wavelength bands. In addition, the same type of object may still reflect light differently for different conditions or states. Accordingly, the set of bands that is useful to perform one task can be quite different from the set of bands that is best to perform another task. For example, hyperspectral imaging can be used to evaluate fruit or other foods. The set of wavelength bands that indicate the condition or quality of a one type of fruit (e.g., strawberries) may be quite different from the set of wavelength bands that indicate the condition of another type of fruit (e.g., peaches). Similarly, different conditions of a fruit may become apparent at different wavelength bands. For example, the bands that would indicate whether strawberries are bruised may be different from the bands that indicate whether the strawberries are ripe.

To provide effective models, the computer system 104 can select the set of wavelength bands for an imaging application based on the type of object to be classified, and even for the set of classes to be used or types of predictions to be made. The computer system 104 receives data 105 indicating the type of ML task to be performed. The computer system 104 performs a band selection process that includes training a ML model 111 to perform the specified ML task and using parameters of the ML model 111 to select the appropriate bands. The process aligns the band selection process with the ultimate ML task for which the selected bands will be used, which helps ensure that the selected bands provide the best performance in the ML task.

For example, if band selection is needed for an ML task to classify the condition of strawberries with a predetermined set of classes (e.g., ripe, unripe, bruised, moldy, or mildewed), then the band selection process can train the ML model 111 to classify strawberries with respect to that predetermined set of classes. This can ensure that the bands that provide the information for the specific ML task at issue, including for each of the specific classes to be predicted, are selected in the band selection process. To facilitate this, the set of training data used can include example images for each of the classes to be predicted, including images similar to those on which that the ML task will be performed. This way, the ML model 111 used for band selection is trained to perform the same function or a function that is as close as possible to the function of the final ML model 152 used for inference processing. If the computer system 104 were used to select bands for a second task, for example, classifying strawberries with respect to a different set of classes or classifying a different type of fruit, the computer system 104 would train a ML model to perform the second task, using a different set of training data representative of the inputs for the second task, and the subset of wavelength bands would often be different.

The computer system 104 can include one or more computers, for example, one or more servers, a cloud computing system, one or more desktop or laptop computers, etc. The data storage system 102 can be a database, a data repository, or other data storage system in communication with the computer system 104. In some implementations, the data storage system 102 can be memory device that is part of the computer system 104, e.g., a hard drive, a solid-state drive, etc.

In the example, the computer system 104 receives data 105 indicating a ML task for which band selection is desired. The data 105 can include various parameters to define the scope and nature of the ML task. For example, the data 105 may indicate a subject or object type to be analyzed (e.g., strawberries), an input for the ML task (e.g., hyperspectral image data), and an output for the ML task (e.g., classification of strawberries from among a specific set of classes, such as ripe, unripe, mildewed, bruised, and moldy). The data 105 may be received through any of various techniques, such as a user interface, an application programming interface (API), a message provide over a communication network, etc.

The computer system 104 includes various elements that are used to perform band selection, including a training module 110 for training machine learning models, a scoring module 112 for assigning scores to bands, a selection module 114 for selecting a subset of bands, and a validation module 116 for verifying the appropriateness of the selection. These elements can be implemented as software modules, hardware modules, or a combination thereof.

One of the first steps in the band selection process is to create and train a ML model 111 to perform the ML task indicated by the data 105. In some implementations, information about the characteristics of a model to be used, such as the set of input data, the set of outputs, the model type (e.g., neural network, support vector machine, clustering model, etc.) can be provided with the data 105 or default set of values can be used.

In some implementations, the computer system 104 uses the data 105 specifying the type of ML task to determine the characteristics of the ML model 111. For example, the computer system 104 can use the number and type of classes to be predicted to set the size of an output layer of a neural network. If the data 105 indicates the ML task involves classification from among five possible classes, the output layer can be set to have five values, one for each class, so the output vector provides a probability distribution over the five classes. The computer system 104 can also use the data 105 to determine the type of input data for the model. This can assist selecting the type of training data from the data storage system 102, which may include image examples showing different types of object and with different types of labels for what is represented in the images. For example, the data 105 may indicate that input data is hyperspectral images of strawberries with a certain 20 wavelength bands. The computer system 104 can then define the input layer of a neural network to accept this type of data. If the data 105 indicates that input data is a 100 pixel by 100 pixel hyperspectral image with data 20 bands, the input layer can have a size of 200,000 (e.g., 100×100×20). The computer system 104 can also select training examples from the data storage system 102 that provide examples of this type of data that are labeled with the appropriate classes.

Figure 2:
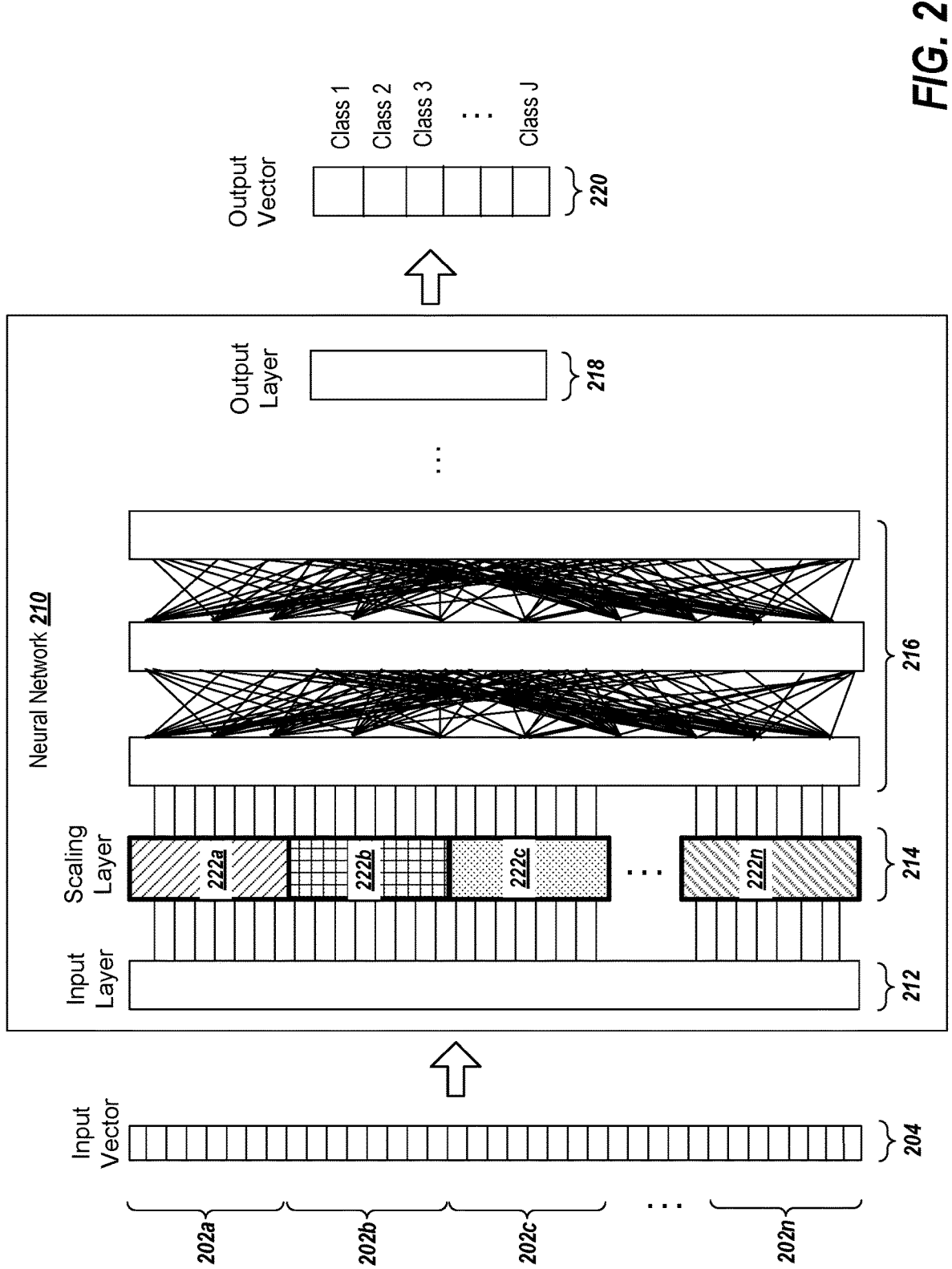
FIG. 2 depicts an example neural network.

The computer system 104 generates a first ML model 111 and uses the training module 110 to train the first ML model 111. The first ML model 111 can include certain band-specific parameters that each affect the data related to the corresponding band. For example, in a neural network model, a first processing layer of the neural network can be a scaling layer that scales input values for different bands with different band-specific scaling weights. Each band-specific parameter in the scaling layer can affect all of the input values for the band equally. In other words, if the input vector includes data for 20 bands, there can be 20 separate band-specific scaling parameters, one for each band. Each band-specific scaling parameter can be applied to all of the input values for the corresponding data band, e.g., with all of the band 1 input values being scaled by a same shared band 1 scaling parameter; all of the band 2 input values being scaled by a same shared scaling parameter; and so on. The first ML model 111 can include many other parameters in addition to the band-specific parameters. For example, the first ML model can be a neural network that includes various neural network layers (e.g., convolutional layers, fully connected deep neural network layers, etc.) after the scaling layer to process the scaled input values. An example is shown in FIG. 2 and described later below.

The computer system 104 obtains training data from the data storage system 102. In the example, the training data includes hyperspectral images of the types of objects corresponding to the ML task indicated by the data 105. The hyperspectral training image 108 depicted in FIG. 1 includes data for N wavelength bands (or simply "bands"), where N is an integer. The data for each band represents measured reflectance information (e.g., detected intensity) for light in a respective spectral range (e.g., color or wavelength range). The first ML model 111 is trained to receive and process image data for all of the bands in hyperspectral training images. In other words, the training module 110 uses information for all N bands of the hyperspectral training image 108 to train the first ML model 111.

The training module 110 trains the first ML model 111 to perform the ML task indicated by the data 105, such as to perform classification or regression of a certain type. The training objective for training the first ML model 111 used for band selection can be the same as the training objective that will ultimately be used at inference. In other words, if the ML task indicated by the data 105 is classifying strawberries among a certain set of classes, the first ML model 111 is trained to perform this same task. In the example, the first ML model 111 is trained to use a set of inputs that includes image data for each of the N bands of hyperspectral images. The training can include various training processes. When the first ML model 111 is a neural network, for example, training can include backpropagation, stochastic gradient descent, or other training algorithms.

During the training process, values of the parameters of the first ML model 111 are adjusted. This includes adjusting the values for the band-specific parameters jointly with the other parameters of the first ML model 111 as the first ML model 111 learns to perform the ML task on the basis of many example hyperspectral images. Nevertheless, as noted above, the first ML model 111 can be structured so that the band-specific parameters have a rather coarse-grained effect compared to other parameters in the first ML model 111. For example, the first ML model can be structured so that each band-specific parameter applies equally to all input values for its corresponding band. One example is to implement a band-specific parameter as a shared weight that applies to all input values of the corresponding band and scales the inputs that band equally. Structuring the first ML model 111 in this way causes the band-specific parameter to apply broadly to the entire set of information for the band, so that the value of the band-specific parameter learned in training is representative of the importance of the band as a whole.

After training the first ML model 111, the computer system 104 determines a band score for each of the N bands based on the values of parameters of the trained first ML model 111. For example, a scoring module 112 can extract the values learned through training for the band-specific parameters and use the parameter values as importance scores for the bands. In general, bands that have more significance to the ML task will have band-specific parameters that acquire larger values through training. Thus, the values of the band-specific parameters indicate how important the bands are relative to each other for performing the ML task. To obtain these scores for the bands, the scoring module 112 does not need to process additional data through the model 111 or evaluate outputs of the model 111. Rather, the scoring module 112 may obtain the band-specific parameter values directly from data indicating the training state of the first ML model 111, e.g., a weight matrix defining the values of the parameters for the model 111.

For example, the first ML model 111 can be a neural network, and the scoring module 112 can determine the band scores based on the weights of one or more layers of the neural network. A higher weight can indicate that the band associated with the weight plays a more significant role in performing the classification/regression tasks performed by the first ML model. More details about the scoring process are explained below with respect to FIG. 3.

In FIG. 1, a representation of the band scores derived from the trained ML model 111 is shown as a bar chart 113. For example, the scoring module 112 may assign scores of 0.5, 1.2, 0.7, 0.4, and 0.1 to bands 1, 2, 3, 4, and N, respectively. The scoring module 112 provides the band scores to the selection module 114.

The computer system 104 provides the calculated band scores to the selection module 114. The selection module 114 uses the band scores to select a subset of the data bands from among all of the N data bands that are being evaluated. In some implementations, the selection module 114 selects bands that have respective scores over a predetermined threshold 115. In some implementations, the selection module 114 selects a predetermined number of bands assigned the highest band scores. For example, a predetermined number of m bands can be set, where m is an integer, and the selection module 114 can select the m bands having the highest band scores. As another example, a combination approach can be used, such as selecting no more than a predetermined maximum number of bands according to the scores, where the band scores of selected bands must also meet or exceed a threshold. In the example of FIG. 1, the selection module 114 selects a predetermined number of bands (e.g., four bands) which have the top four band scores among the N bands. The selected subset of bands is shown as bands 2, 3, 14, and 18.

The computer system 104 provides data indicating the selected bands to the validation module 116 that verifies whether the selected subset of bands provides sufficient accuracy for the ML task. The validation module 116 works with the training module 110 to create and train one or more second ML models 118 to perform the ML task. One of the second ML models 118 is configured to receive and process data for the selected subset of bands but not for the other, non-selected bands. The validation module 110 then compares the performance of this model 118 with other models to determine whether the accuracy of the model 118 is sufficient. For example, the validation module 110 can use the second ML model 118 that uses only input data for the selected subset of bands to classify various input data examples. The validation module 110 then compares the accuracy of the second ML model 118 with that of one or more other models, such as a model that uses input data for all N bands (e.g., the model 111 or another model trained to use data for all N bands). The validation module 116 can then verify that the second ML model 118 that uses only the selected subset of bands meets predetermined performance criteria, such as accuracy that meets or exceeds the accuracy of the model that uses data for all N data bands. In some cases, accuracy less than the model that uses data for all N data bands may be permitted accounting for the increased efficiency of a smaller model, but accuracy may still be required to be no less than some threshold amount below the accuracy of the model that uses data for all N data bands.

In some implementations, the validation module 116 causes the training module 110 to generate and train multiple different second ML models 118 to respectively use input data for different combinations of bands. For example, second ML models 118 can be generated for different sub-combinations of the selected subset of bands as well as for the full set of N bands. The validation module can compare the performance of all of the second ML models 118 and select the band combination for the second ML model 118 that performs the best. In some cases, this may include less than all of the bands in the earlier selected subset, such as only three of the four bands selected by the selection module 114.

Based on the results of the validation module 116, the computer system 104 provides output 150 indicating the validated subset of bands for the ML task. For example, the computer system 104 can provide the output 150 to the computing device 106 (e.g., a client device) for presentation and/or further processing. The output 150 of the computer system 104 can indicate the validated subset of bands (e.g., bands {2, 3, 14, 18} in this example) and indicate this subset as the bands to use for performing the ML task. For example, the output 150 may be provided in response to a request for band analysis and selection, which may include or be provided with the data 105.

In some implementations, the computer system 104 may additionally or alternatively provide a ML model 152 (e.g., which may be one of the models 118 or may be a different model) trained to perform the ML task based on the validated subset of bands, allowing the computing device 106 or another system to perform inference processing based on data for the validated subset of bands. As another example, the computer system 104 may additionally or alternatively configure itself or another system to perform inference processing using the model 152. In this case, the computer system 104 may receive input data to be processed, and in response the computer system 104 may use the model 152 to generate and provide an inference result (e.g., a classification, a value, etc.).

In some implementations, the computing device 106 and the computer system 104 can be portions of a larger computing device or system. In some implementations, the computing device 106 can be separate from the computer system 104. For example, the computing device 106 can be a mobile device in communication with the computer system 104. The computer system 104 can communicate with the computing device 106 through wired or wireless communications (e.g., through Internet, Intranet, local networks such as Wi-Fi, Bluetooth, etc.).

The computing device 106 can display the information that the computing device 106 receives from the computer system 104, e.g., through a display screen, can perform further process on the received information, and/or can use such information to analyze (e.g., classify) other data. For example, the recipient device 106 may use the ML model 152 that it receives from the computer system 104 to classify hyperspectral images. The techniques can be used to obtain a model to perform any of various other ML tasks, such as object recognition, object classification, regression tasks, etc.

The computer system 104 may use the band selection process shown in FIG. 1 to identify and validate different subsets of bands for different types of ML tasks. For example, the computer system 104 may perform the band selection process to select the bands for object recognition, e.g., to detect instances of any of multiple types of fruit in an image. The computer system 104 may again perform the band selection process to select the bands for a different type of object recognition, such as to detect a specific type of fruit (e.g., to distinguish between a strawberry and blackberry). The computer system 104 may perform the band selection process a third time for another type of classification, such as to determine whether a strawberry depicted in an image is unripe, bruised, mildewed, good, or decayed. The computer system 104 may determine that a different subset of bands is best for the different classification tasks, and so may select and validate the significant bands based on the intended classification tasks. Accordingly, the computer system 104 may select different subset of bands for different classification or regression tasks.

In some implementations, the computer system 104, the device 106, or another computer system may use the selected subset of wavelength bands to train a model for the ML task indicated by the data 105. The computer system can then provide output indicating the result of performing the classification or regression task. For example, a system configured to receive hyperspectral images of fruit can output a score or classification for fruit, using a model trained to use the selected subset of wavelength bands determined as discussed with respect to FIG. 1. One or more other devices can use the result to take any of various actions, for example, to package fruit identified as good, to remove fruit identified as bruised, to sort fruit into different conveyors or containers, to send notifications or reports regarding the fruit assessed, and so on.

FIG. 2 depicts an example neural network 210 that can be used for band selection. The neural network 210 shows an example model topology that can be used for the first ML model 111 of FIG. 1.

The neural network 210 has multiple layers including an input layer 212, a scaling layer 214, intermediary layers 216, and the output layer 218. The neural network 210 receives an input vector 204 and provides an output vector 220.

The input vector 204 can be a vector comprising values for each of the N bands being evaluated for band selection. For example, for hyperspectral images, the input vector 204 can include values that represent the measured intensity for each of the N bands for each pixel in the image. The computer system 104 can obtain hyperspectral images from the data storage system 102 can generate an input vector to represent the content of each hyperspectral image to be used as a training example.

A hyperspectral image with N bands can be considered to be a collection of N images having the same pixel dimensions. For example, there is a first image for band 1, a second image for band 2, and so on. The input vector 204 is configured to receive the data for all of the N bands of the hyperspectral image. Each value in the input vector 204 represents the measured intensity value for a specific pixel for a specific band.

In the example depicted in FIG. 2, the values on the input vector 204 are divided into N sections 202a-202n corresponding to the N bands of a hyperspectral image. For example, values representing pixel intensities for a first band are provided in section 202a, values representing pixel intensities for a second band are provided in section 202b, and so on, and values related to the $N^{th}$ band are provided in section 202n. Each of the sections 202a-202n includes a value for each pixel in the hyperspectral image. For example, if the hyperspectral image has 1,000 pixels, each of the N sections 202a-202n has 1,000 values. The values in the sections may represent corresponding pixels, for example, the first value in each of the sections 202a-202n can represent an intensity for the same pixel (e.g., a first pixel in the image) but for different spectral bands.

The output of the neural network 210 is the output vector 220. In the example, the output vector 220 is an array of J values, one for each of a predetermined set of classes 1 through J, to represent a ML task of classification from among the J classes. Each value in the output vector 220 represents a likelihood that the input data (e.g., a hyperspectral image represented by the input vector 204) should be classified into the corresponding class. For example, the first value can be a probability score that the input belongs to class 1, the second value can be a probability score that the input belongs to class 2, and so on. In this manner, the output vector 220 may represent a probability distribution over the J classes.

The form of the output of the neural network 210 may vary to fit the application. A probability distribution over a predetermined set of classes, as depicted in FIG. 2 to represent one type of classification task, is only one of many possible outputs that can be used. For example, the neural network 210 may instead be configured to perform a regression task, a binary classification task, a clustering task, a region proposal or image masking task, and so on. These and other types of ML tasks may involve different types of output layers and model output types, which should be selected for the ML task to be performed. The unsupervised band selection process described herein is versatile enough be used for ML tasks involving a diverse range of model outputs, in part because output of the model is not needed to score the bands. Rather, the model 210 can simply be trained for a desired training objective, regardless of the desired form of the output, and values for parameters within the model (e.g., values for the parameters of the scaling layer 214) can be used for the band scores.

The neural network 210 is configured so that the input layer 212 of receives the input vector 204. The input layer 212 can perform a preprocessing function on the input vector 204. For example, the input layer may apply a normalization function to limit the values of the input vector to a predetermined range. The input layer 212 provides its outputs (which can be the same as the input vector 204 or an altered form of the input vector 204) to the scaling layer 214. In some implementations, input and output values of the input layer 212 have one-to-one relationships, with each output being based on only a single input to the input layer 212.

The scaling layer 214 is configured to apply a weight or scaling factor to the data received from the input layer 212. The scaling layer 214 can be a first layer of the neural network 210 following the input layer (e.g., a first hidden layer or first processing layer of the neural network 230), and in some implementations may receive the values of the input vector 204 passed to it.

The scaling layer 214 includes a set of band-specific parameters 222a-222n to scale the values it receives, with one band-specific parameter 222a-222n for each of the N bands. In some implementations, a single band-specific parameter 222a-222n is shared and applied equally for all values in the corresponding band. For example, (1) a first band-specific parameter 222a is used to scale all of the values for section 202a of the input vector 202 corresponding to a first band, (2) a second band-specific parameter 222b is used to scale all of the values for section 202b of the input vector 204 corresponding to a second band, (3) a third band-specific parameter 222c is used to scale all of the values for section 202c of the input vector corresponding to a third band, etc. In this manner, the band-specific parameters 222a-222n each affect data for only a single band, and each band-specific parameters 222a-222n affects all values in its corresponding band equally.

The scaling layer 214 so that each output of the scaling layer 214 is affected by only a single input to the scaling layer. In other words, each output or activation of the scaling layer 214 does not combine data from multiple inputs to the scaling layer 214. In some implementations, the scaling layer 214 receives input values and provides a scaled version of the input values, with each input value being scaled by the band-specific parameter 222a-222n for its corresponding band.

The function of the scaling layer 214 is limited, by enforcing the use of a same, shared parameter across data for a band as a whole and by limiting processing to scaling individual values. During training, these limitations caused by the structure of the neural network architecture limit the role of the scaling layer 214 in learning to perform the ML task. In other words, the scaling layer 214 is limited to incorporating coarse-grained, whole-band-level information about the ML task the neural network 210 is trained to perform. The scaling layer 214 learns simply to weight bands relative to each other, without learning the more nuanced and complex relationships that would be possible with more interconnections among input values and larger numbers of parameters. Nevertheless, due to these aspects of the neural network architecture, training the neural network 210 causes the band-specific parameters 222a-222n to learn the importance of the different bands relative to each other.

The scaling layer 214 provides its output (e.g., scaled versions of its input) to one or more intermediate layers 216. Depending on the application of the neural network 210, the intermediate layers 216 can include different number and forms of layers. The example illustrated shows various fully connected deep neural network layers. Other types of layers may be used, for example, the intermediate layers can include a one or more convolutional layers, one or more rectified linear unit (ReLU) layers, locally connected layers, partially connected layers, etc.

The last layer of the intermediate layers 216 provides its output to the output layer 218, which provides the output vector 220 as output. In the illustrated example, the output layer 218 is a softmax layer that provides a likelihood value for each of the J classes to be predicted. Accordingly, the output vector 220 is an array of J values, where J represents the number of available classes. Each value in the output vector 220 represents a probability score for the class corresponding to that output value. Of course, as discussed above, different output layers and output types can be used for different ML tasks.

As an example, an ML task may involve classifying hyperspectral images of strawberries among five classes, e.g., unripe, bruised, decayed, good, and mildewed. In this case, the input vector 204 represents information for each of the pixels of a hyperspectral image for each of the N wavelength bands. The output vector 220 would be a 5×1 vector, where the one value of the output vector indicates the likelihood that the strawberry depicted in the hyperspectral image belongs to the "unripe" class, another value indicates the likelihood that the strawberry belongs to "bruised" class, another value indicates the likelihood that the strawberry belongs to the "decayed" class, etc.

In general, the neural network 210 can have any appropriate architecture for the ML task for which band selection is being performed. For example, starting with a base model architecture to eventually be used for inference processing, the computer system 104 can append a scaling layer to the front of the base neural network, so the scaling layer will scale the inputs with band-specific parameters and provide the scaled input to the base model architecture. In this way, any of various machine learning models including different neural network topologies can be easily adapted for use in the band selection process. This technique also has the advantage of close alignment between the structure of the model 210 used for band selection and the structure of the model to be used for inference processing, which helps maximize the accuracy of the band selection process.

As explained above, the training module 110 trains a first ML model 111 based on data for all bands of the training data. The neural network 210 is an example of a model that can be used as the first ML model 111. Once the a model such as the neural network 210 is trained, the scoring module 112 and the selection modules 114 score the bands of the training data based on parameters learned through training, e.g., based on the band-specific parameters 222a-222n of the scaling layer 214.

Upon training the neural network 210, the scoring module 112 can determine a score for each band based on the band-specific parameters 222a-222n of the neural network 210. The values of the band-specific parameters 222a-222n can be directly used as scores for their respective bands. For example, the scoring module 112 uses the band-specific parameter 222a as a score for the first band (e.g., associated with the section 202a of the input vector 204), uses the band-specific parameter 222b as a score for the second band (e.g., associated with the section 202b of the input vector 204), etc. The selection module 114 uses the band scores to select a subset of bands associated with the highest scores.

Figure 3:
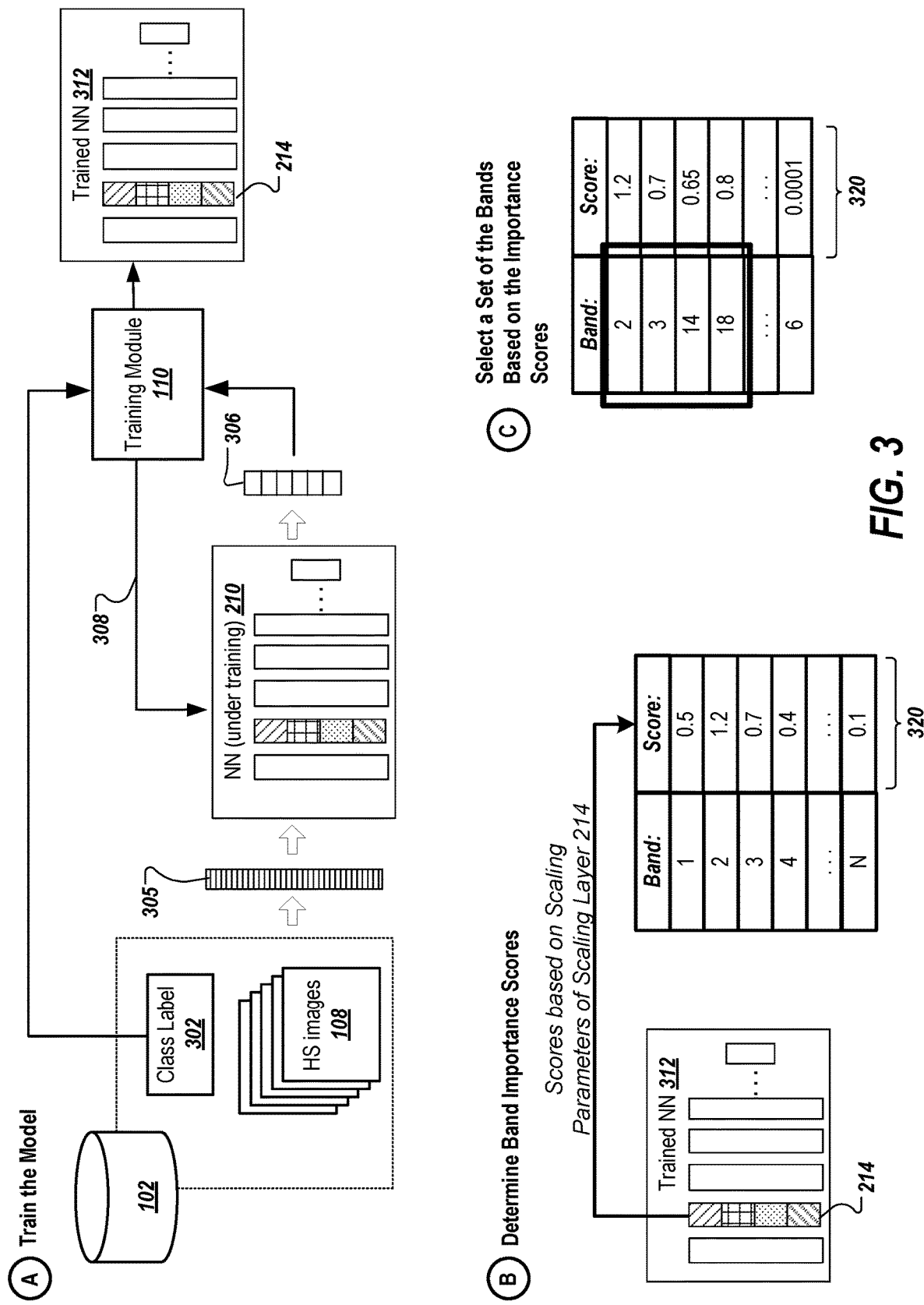
FIG. 3 depicts an example process of selecting a subset of data bands to be used in generating a machine learning model.

FIG. 3 depicts an example process of selecting a subset of data bands to be used in generating a machine learning model. This process can include selecting a subset of data bands based on the weights of a trained neural network 312. FIG. 3 provides an overview of band scoring and selection actions performed after training the first ML model 111 in FIG. 1. FIG. 3 shows three stages labeled (A) through (C). These stages respectively represent training a ML model to process input for a set of data bands, determining band importance scores based on parameters of the ML model learned during training, and selecting a subset of the bands based on the importance scores.

In stage (A) of FIG. 3, the training module 110 of FIG. 1 performs a training process to obtain a trained ML model, represented by multi-layer neural network 312. The training module 110 trains the neural network 312 using the hyperspectral training images 108 and the respective class labels 302. The ML model used can have a structure as discussed for neural network 210 of FIG. 2. The neural network 210 is shown in FIG. 3 to represent the ML model during training, as the parameters (e.g., weights, bias values, etc.) are iteratively altered to learn from example data. The neural network 312 has the same structure as neural network 210, but with the parameters trained through the training process.

The training module 110 uses all N bands of the hyperspectral training images 108 as input to train the neural network 210 and create the trained neural network 312. In each training iteration, the training module generates an input vector 305 having feature values derived from one of a set of hyperspectral images 108. The input vector 305 is provided as input to the input layer of the neural network 210, and the neural network 210 processes the input vector 305 to generate an output vector 306.

The training module 110 receives the output vector 306 from the neural network 210. The output vector 306 can be a J×1 vector similar to the output vector 220 depicted in FIG. 2, or can have another dimension. For example, for classifying the image among J classes, the output vector 306 can provide likelihood scores that respectively indicate how likely the hyperspectral training image 108 belongs to the J classes. The training module 110 uses the predetermined class label 302 for the image 108 of the current training iteration to determine whether the neural network 210 has predicted a correct class for the training hyperspectral image 108. More generally, the training module 110 can evaluate the output of the neural network 210 with respect to any appropriate reference, such as a score or value label for a regression task.

The training module 110 then sends instructions to alter the training state of the neural network 210, for example, to adjust the weight values for the nodes or neurons of the neural network 210. For example, if the training module 110 determines that the output vector 306 indicates the wrong class is most likely (e.g., the most-likely class is different from the class indicated by the class label 302), the training module 110 modifies the weights of the neural network 210 with instructions and altered parameters 308. Similarly, even if the output vector 306 indicates that the correct class is most likely, the training module 110 can alter the weights to better distinguish among the classes. The training can include backpropagation or other training techniques. Various training algorithms can be used, such as gradient descent, conjugate gradient method, Newton's method, Quasi-Newton's method, etc.

The training module 110 continues the training process until it obtains a trained neural network 312, which represents the first ML model 111 in FIG. 1 that is configured to receive input for each of the N data bands. Training can continue until a predetermined condition is met, such as training completes with available images 108, a predetermined level of accuracy of prediction is achieved by the model, a predetermined number of training iterations are performed, etc.

As discussed with respect to FIG. 2, the trained neural network 312 includes a scaling layer 214 that includes a weight for each of the N data bands of the training hyperspectral image 108. The weights for nodes of the scaling layer 214 are trained along with the weights for the nodes of the other layers in the neural network. In other words, the layers of the neural network 312 can be trained jointly.

In stage (B) of FIG. 3, a score for each of the N data bands is determined based on the weights of the trained neural network 312. In the example process depicted in FIG. 3, the neural network weight parameters of the scaling layer 214 are used to determine a respective score for each band. Significantly, the scores can be determined based on the trained parameter values themselves, without using output of the trained neural network 312 at the output layer and without using activations at the scaling layer 220.

Rather than using the trained neural network 312 to process input and evaluating the results of the processing, the scores can be derived from the training state of the trained neural network 312. In other words, the structure of the neural network or other ML model used can be designed to have one or more parameters that affect individual data bands. As shown for the parameters of the scaling layer 214, a single value is shared for and applied to all inputs of a same data band. The particular parameters for scaling can each apply to multiple input values for a data band, or even apply generally to all input values of a single data band. By design, this type of parameter can act in a gating role for a band, e.g., as coarse-grained, band-by-band controls on how the data for different bands are weighted or otherwise are allowed to influence processing of the model. As a result, the values of these particular parameters determined through training the model as a whole can reveal the relative importance of the bands relative to each other.

For example, the scoring module 112 of FIG. 1 may extract the values of the band-specific parameters 222a-222n and use these values as importance scores 320 for the bands. In the example, the value of parameter 222a in the scaling layer 214 is 0.5, and so the score determined for Band 1 is 0.5. Similarly, the value of parameter 222b in the scaling layer 214 is 1.2, so the score determined for Band 2 is 1.2. Scores are determined for the other bands in the same manner, with the value of the parameter 222n being used as the score for Band N. Other techniques can be used for generating importance scores, such as applying a function to the band-specific parameter(s) of a band to generate the importance score for the band. For example, if multiple band-specific parameters are used for different groups of inputs for a band, the multiple band-specific parameters may be averaged, weighted, or otherwise combined or aggregated to obtain a importance score.

A higher score 230 can indicate that the band associated with the score plays a more significant role in performing the classification or regression tasks performed by the trained neural network 312. For example, the score for Band 3 (e.g., 0.7) is less than score for Band 2 (e.g., 1.2), which indicates that data from Band 3 has less predictive value than data from Band 2 for the machine learning task the trained neural network 312 was trained to perform.

In stage (C) of FIG. 3, a subset of the bands is selected based on the band scores 230. The scoring module 112 provides the band scores to the selection module 114 (see FIG. 1). The selection module 114 can rank the bands based on their respective scores 230 to select bands from among all N bands.

In some implementations, the selection module 114 selects the bands associated with a predetermined maximum number of bands, e.g., by selecting the bands having the top m scores for the set of bands. For example, m=4 in FIG. 3, meaning that the bands associated with the top four scores are selected as the most important subset of bands for the machine learning task. In the illustrated example, the subset of bands selected in FIG. 3 include bands 2, 3, 14, and 18. In some implementations, the selection module 114 selects any band that has a score higher than a predetermined threshold score for inclusion in the set of bands.

As explained with respect to FIG. 1, once the set of bands are selected, a validation module 116 can determine whether all or only a subset of the selected set of bands are needed to provide a machine learning module with the highest performance. An example of the validation process is shown in FIG. 4.

Figure 4:
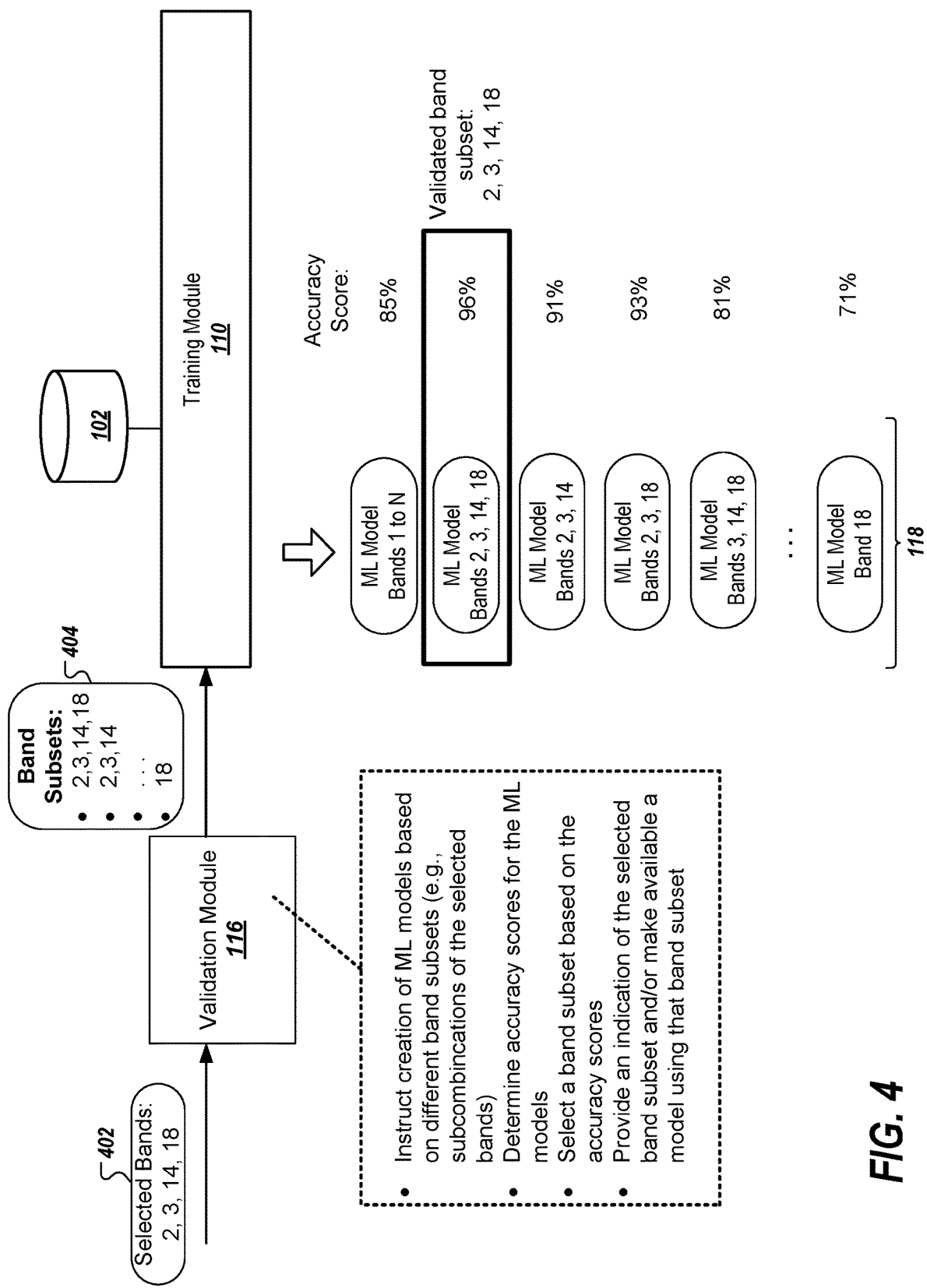
FIG. 4 depicts an example process to validate the selection of data bands.

FIG. 4 provides an example validation process. The validation module 116 works with the training module 110 to determine a subset of bands (or "band subset") that provides the highest performing ML model. The system can select the subset based on accuracy of results. In addition or as an alternative, the system can be select based on other criteria, such as selecting the subset with the lowest number of bands (e.g., and thus lowest resulting model size) that provides at least a minimum level of accuracy, or selecting the highest accuracy while prioritizing bands of data that are easier to collect, and so on.

The validation module 116 receives data 402 indicating a set of bands {2, 3, 14, 18} that were selected based on the importance scores as discussed for FIG. 3. The validation module 116 generates multiple subsets of bands based on the selected bands indicated. Examples of subsets include {2, 3, 14, 18}, {2, 3, 14}, {2, 3, 18}, . . . {18}. The subsets represent different combinations and subcombinations of the selected set of bands. In some implementations, all of the different possible subsets (e.g., all the unique permutation) are identified. The validation module 116 provides data 404 indicating each of the subsets that should be tested to the training module 110, which generates a second ML model 118 for each of the indicated subsets of bands. Each of the second ML models 118 is trained to receive input for only the specific bands in the corresponding band subset for that model. The training module 110 can also train a model to use input for all N bands, or use first ML model 111 for this analysis, to represent the level of performance that would be obtained using all N bands. The models 118 can all be of a same type or topology (e.g., neural network models of the same number and type of layers).

The training module 110 provides the trained ML models 118 to the validation module 116. The validation module 116 then runs performance tests on the ML models 118 to assess the performance of the models that use input for different combinations of bands. For example, the validation module 116 can provide input data to each of the models 118 representing features of an image 108, process the input using the models 118, and then determine whether the various modules 118 accurately determined the classification for the image 108. The validation module compares the output of each of the ML models to the labels associated with the respective training data image examples to calculate an accuracy score for each of the ML models. By performing this type of testing for multiple images, the validation module can determine accuracy scores for the models 118. In the example, the accuracy scores indicate the percentage of images that the respective models classified accurately over the testing.

The validation module 116 can identify the ML model 118 associated with the highest accuracy score, and determines the band subset associated with that highest-scoring ML model 118. For example, in FIG. 4, the validation module 116 determines that the band subset of {2, 3, 14, 18} is associated with the highest accuracy score. Accordingly, the validation module 116 validates the band subset {2, 3, 14, 18} as the subset of bands that should be used to perform the particular ML task (e.g., data classification or regression) indicated by the input 105 in FIG. 1. In this example, the validated subset of bands provides higher accuracy than using all of the N bands. In addition, by using fewer than the N bands, the resulting model can be smaller (e.g., with fewer parameters and less storage space required) and can be operated with less power consumption and computational demands.

The validation module 116 can optionally assess performance for factors in addition to or instead of accuracy. The performance can be measured as a measure of data processing functions that a ML model performs. For example, performance of a ML model can be calculated as a function of accuracy, speed, storage requirements, computational requirements, network traffic requirement, etc. For example, a scoring function may provide weighted accuracy scores that weight accuracy up or down based on model size, speed, and/or computational requirements. In this way, the validation process can account for various factors or constraints that may be applicable to the desired use of the model and the subset of bands being selected.

In some implementations, if the first ML model 111 provides a performance higher than any of the second ML models, the validation module 116 validates the bands of the highest performing second ML model 118. In some implementations, if the first ML model 111 has a performance higher than any of the second ML models 118, the validation module 116 instructs the selection module 114 to change its criteria in selecting the set of bands based on the importance scores. In response, the selection module 114 may change a threshold score that it uses to select the bands, and/or may change (e.g., increase) the number of selected bands.

For example, the hyperspectral training image 108 may be labeled and stored in the data storage system 102 as an image of a bruised strawberry. A ML model that correctly classifies the hyperspectral training image 108 as a bruised strawberry (or a bruised berry) may be deemed accurate.

The validation module 116 provides the validated band subset and/or the ML model trained based on the validated band subset as an output. For example, the validation module 116 can send output indicating a validated band subset (which may be different from the subset selected in FIG. 3) to a computing device 106 as described above with respect to FIG. 1.

Figure 5:
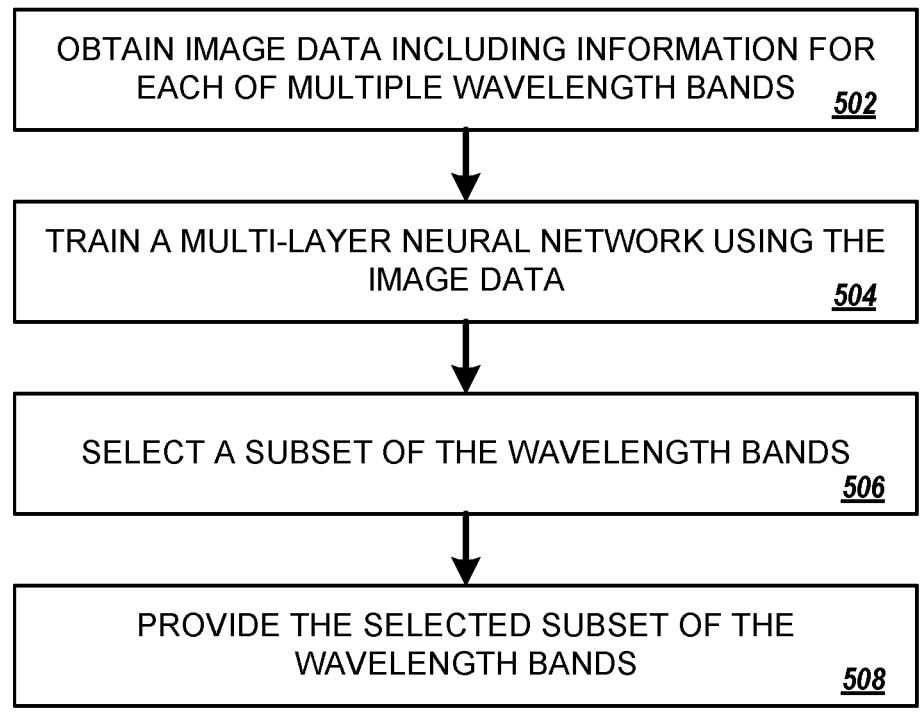
FIG. 5 depicts an example process for using machine learning to select data bands.

FIG. 5 depicts an example process 500 of using machine learning to select data bands. The example process 500 is executed by computing device, for example, the computer system 104 of FIG. 1.

The computing device obtains image data that includes information for multiple bands, e.g., multiple wavelength bands (502). For example, the image data can include hyperspectral images as discussed with respect to FIGS. 1 and 3. The image data can include information for each of the multiple bands for each pixel of the image.

The computing device trains a multi-layer neural network using the image data (504). The computing device trains the neural network to perform one or more classification or regression tasks. The multi-layer neural network can include a scaling layer that assigns a weight to each of the multiple bands. FIG. 2 provides an example multi-layer neural network. FIG. 3 provides an example process in obtaining a trained neural network 312.

The computing device selects a set of the wavelength bands (506). The computing device selects the set of wavelength bands based on parameters of a layer of the multi-layer neural network. The parameter can be determined through training of the multi-layer neural network using the image data. FIG. 3 describes an example process of selecting a set of wavelength bands from among the multiple wavelength bands.

The computing device provides the selected set of bands for one or more classification or regression tasks (508). For example, the computing device may send the set of bands and a description of the classification/regression tasks to a recipient device. FIG. 1 provides further details on providing the selected bands to a recipient device.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A computer-implemented method comprising:
   accessing, by a computing system, image data comprising information for each of multiple wavelength bands;
   identifying, by the computing system, a subset of the multiple wavelength bands based on parameters of a layer of a first machine-learning model; and
   generating an input data set based on a portion of the image data, wherein the portion of the image data corresponds to the subset of the identified multiple wavelength bands; and
   generating a result that identifies or characterizes a component of an object depicted in the image by processing the generated input data set using a second machine-learning model.

2. The method of claim 1, wherein the image data comprises image data for multispectral images or hyperspectral images, wherein the multispectral images or hyperspectral images each include data for four or more different wavelength bands.

3. The method of claim 1, wherein the second machine-learning model is configured to perform a classification task, and wherein the result includes a particular class.

4. The method of claim 1, wherein the second machine-learning model was trained to perform a classification or regression task based on input information for fewer than all of the multiple wavelength bands in the subset.

5. The method of claim 1, wherein the first machine-learning model is configured to receive an input vector comprising multiple sets of input values, each set of input values being derived from image data for a different wavelength band of the multiple wavelength bands; and
   wherein, for each set of input values, the first machine-learning model is configured to scale each input value in the set of input values using a same band-specific scaling parameter having a value learned through training of the first machine-learning model.

6. The method of claim 1, wherein the first machine-learning model comprises (i) a scaling layer configured to apply the band-specific scaling parameters for the multiple wavelength bands to the respective sets of input values for the multiple wavelength bands, and (ii) one or more additional layers configured to process output of the scaling layer.

7. The method of claim 6, wherein each of the band-specific scaling parameters is a neural network weight or a neural network bias.

8. The method of claim 6, further comprising extracting values for the band-specific scaling parameters from the first machine-learning model; and
   wherein identifying the subset of the wavelength bands is based on an evaluation of the extracted values for the band-specific scaling parameters.

9. The method of claim 1, wherein identifying the subset of the wavelength bands comprises:
   selecting a predetermined number of the multiple wavelength bands for which the extracted values have a highest magnitude.

10. The method of claim 1, wherein identifying the subset of the multiple wavelength bands comprises:
    selecting each of the wavelength bands for which the extracted value satisfies a threshold.

11. The method of claim 10, wherein the identifying the subset of the multiple wavelength bands, the generating the input data set, and the generating the result are part of a fully automated process.

12. The method of claim 11, further comprising:
    sorting the object based on the result.

13. The method of claim 12, wherein the sorting comprises facilitating moving the object onto a particular conveyor or into a particular container, wherein the particular conveyor or particular container is identified based on the result.

14. A system comprising:
one or more processors;
one or more computer-readable media storing instructions that, when executed by the one or more processors, cause the one or more processors to perform operations comprising:
  accessing image data comprising information for each of multiple wavelength bands;
  identifying a subset of the multiple wavelength bands based on parameters of a layer of a first machine-learning model; and
  generating an input data set based on a portion of the image data, wherein the portion of the image data corresponds to the subset of the identified multiple wavelength bands; and
  generating a result that identifies or characterizes a component of an object depicted in the image by processing the generated input data set using a second machine-learning model.

15. The system of claim 14, wherein the image data comprises image data for multispectral images or hyperspectral images, wherein the multispectral images or hyperspectral images each include data for four or more different wavelength bands.

16. The system of claim 14, wherein the second machine-learning model is configured to perform a classification task, and wherein the result includes a particular class.

17. The system of claim 14, wherein the first machine-learning model comprises (i) a scaling layer configured to apply the band-specific scaling parameters for the multiple wavelength bands to the respective sets of input values for the multiple wavelength bands, and (ii) one or more additional layers configured to process output of the scaling layer.

18. The system of claim 14, wherein the operations further comprise:
  sorting the object based on the result.

19. The system of claim 18, wherein the sorting comprises facilitating moving the object onto a particular conveyor or into a particular container, wherein the particular conveyor or particular container is identified based on the result.

20. One or more non-transitory computer-readable media storing instructions that, when executed by one or more processors, cause the one or more computers to perform operations comprising:
  accessing image data comprising information for each of multiple wavelength bands;
  identifying a subset of the multiple wavelength bands based on parameters of a layer of a first machine-learning model; and
  generating an input data set based on a portion of the image data, wherein the portion of the image data corresponds to the subset of the identified multiple wavelength bands; and
  generating a result that identifies or characterizes a component of an object depicted in the image by processing the generated input data set using a second machine-learning model.

* * * * *